United States Patent [19]

Tucker et al.

[11] Patent Number: 4,486,928
[45] Date of Patent: Dec. 11, 1984

[54] APPARATUS FOR TOOL STORAGE AND SELECTION

[75] Inventors: Thomas L. Tucker; Bill B. Clark, both of Fort Wayne, Ind.

[73] Assignee: Magnavox Government and Industrial Electronics Company, Fort Wayne, Ind.

[21] Appl. No.: 281,584

[22] Filed: Jul. 9, 1981

[51] Int. Cl.³ .............................................. B23Q 3/157
[52] U.S. Cl. ..................................... 29/26 A; 29/568; 414/744 A; 414/749
[58] Field of Search ..................... 29/568, 26 A, 26 R; 414/744 R, 744 A, 749; 279/1 TS

[56] References Cited

U.S. PATENT DOCUMENTS

| | | | |
|---|---|---|---|
| 3,442,175 | 5/1969 | Heap et al. | 29/568 X |
| 3,458,924 | 8/1969 | Oslebo | 29/568 |
| 3,709,623 | 1/1973 | Stephan et al. | 29/568 X |
| 3,973,863 | 8/1976 | Smith | 29/568 X |
| 4,046,263 | 9/1977 | Cwycyshyn | 414/744 A |
| 4,145,802 | 3/1979 | D'Auria | 414/749 |
| 4,188,815 | 2/1980 | Mizushima | 29/568 X |
| 4,310,958 | 1/1982 | Balaud et al. | 29/26 A |

FOREIGN PATENT DOCUMENTS

| | | | |
|---|---|---|---|
| 82146 | 7/1981 | Japan | 29/568 |
| 2073625 | 10/1981 | United Kingdom | 29/568 |
| 770737 | 10/1980 | U.S.S.R. | 29/568 |

*Primary Examiner*—William R. Briggs
*Attorney, Agent, or Firm*—Thomas A. Briody; William J. Streeter; Richard T. Seeger

[57] ABSTRACT

A tool rest has a plurality of tool storage locations for tools used at a work station. The tool rest is stationary relative to the work station. An automated robotic arm transports a tool between the tool rest and the work station. The arm movement is programmed to select a particular tool. The tools are releasably retained at their respective storage locations and are automatically released just prior to their transport to the work station, and are retentively held at their respective storage locations after return thereto.

17 Claims, 14 Drawing Figures

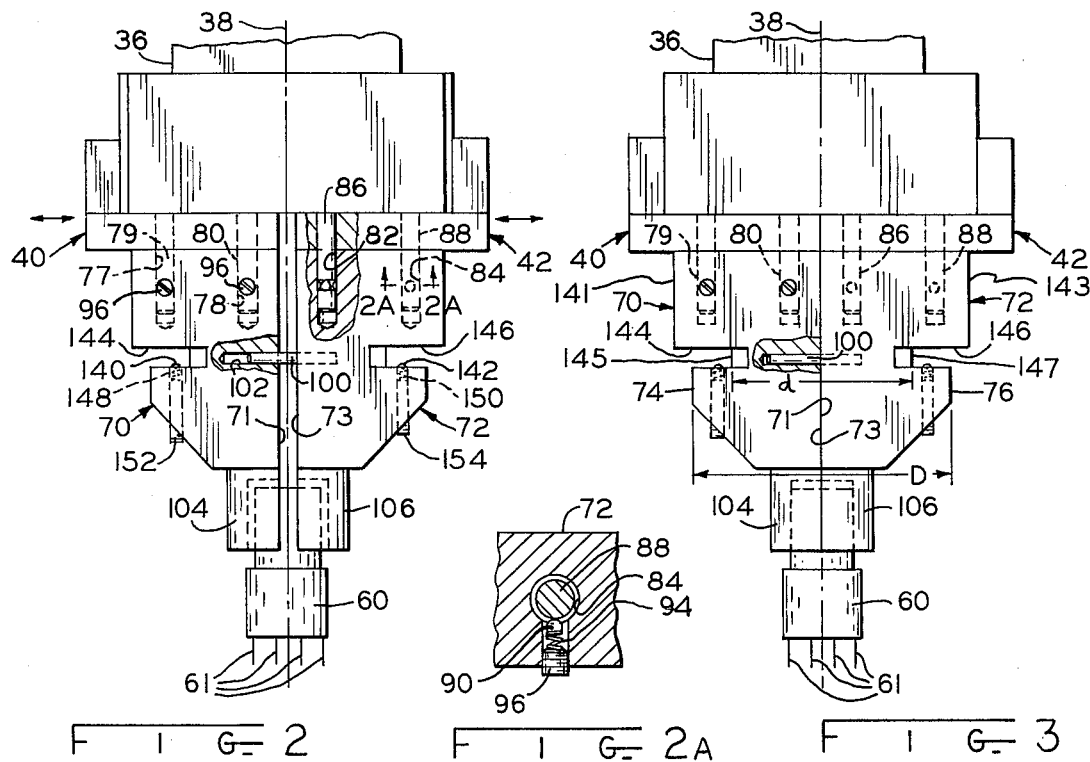
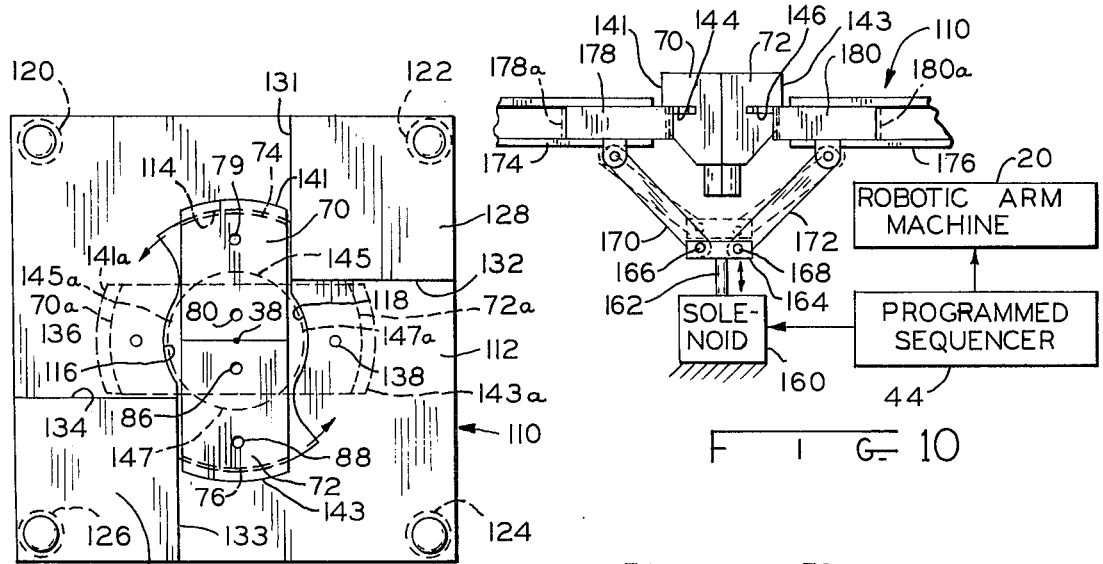
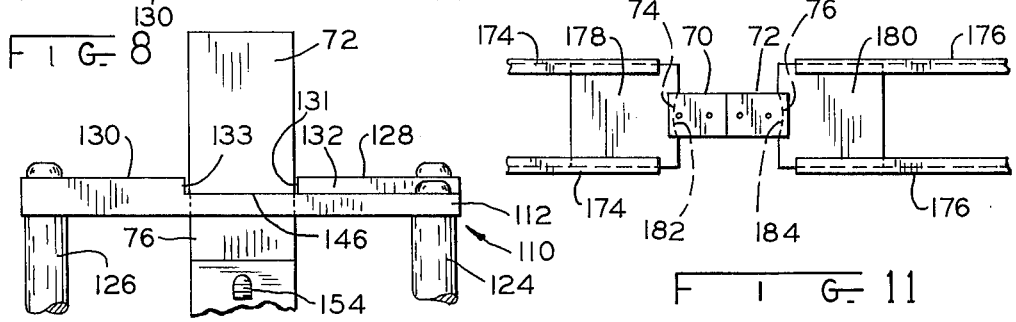

APPARATUS FOR TOOL STORAGE AND SELECTION

BACKGROUND OF THE INVENTION

1. Field of the Invention

This invention is in the field of automated tool selection from a storage location and tool transport to a work station, for a selected one of a plurality of tools. The tools are used at the work station and returned to the storage location after use.

2. Description of the Prior Art

In numerous manufacturing operations, it is necessary to use at any one time at a work station, one of a plurality of tools. Typically the tools are stored in a tool rest and then a tool is manually selected for use according to the particular operation being performed at the work station. The tool is then manually attached to a power driven work member to perform the work task. The tool selected for use is then returned to the tool rest and another tool is selected for use for the next work operation. The manual effort required is time consuming, tiring, and worker availability is required whenever a tool change is made, decreasing worker efficiency.

Efforts have been made to eliminate the need for manual tool selection, change, and return, and to automate as completely as possible tool handing operations. Generally, these efforts have included tool holders which are moved or indexed to a work station, as by a rotary turret or an endless tool conveyer chain, wherein the tools are removed from the holder for use and then returned to the holder after use. The holder is then moved so as to position a new tool at the work station. The complexity of tool retention and removal from the holder, tool indexing, and the limited storage capacity in a moving holder, have proven disadvantages of previous automated devices. The art is exemplified in United States patents having the following numbers: 3,431,635; 3,526,033; 3,684,101; 4,182,021; 3,074,147; 3,163,291; 3,176,847; and 3,052,999.

SUMMARY OF THE INVENTION

A tool rest is provided with a plurality of tool receiving holders at storage locations positioned in rows and columns or other geometric arrangement. The rest is in fixed relation to a work station where the tools are used. A programmed robotic arm having articulated segments is provided with a part of opposed tool gripping jaws at the distal end of the endmost arm segment. The jaws are capable of rotation about an axis central of the tool, to rotate the tool about the axis. Arm movement and jaw rotation is controlled by a programmed sequencer to perform a work task. Such robotic arm machines and sequencers are known to the art, one such machine being manufactured by the Unimation Corpation, Danbury, Connecticut, PUMA ® Model.

In a preferred embodiment of this invention, the tools are inserted into openings formed at each of the storage locations, and locked in the tool rest by a twisting movement imparted by the robotic arm. The tools may be unlocked from the tool rest by a reverse twist, and then removed from the openings.

Each tool is divided into two parts, one part attachable to each jaw. Doweling pins are provided depending from each jaw that register with corresponding sockets in the respective tool parts, as the jaws engage the parts. Each socket is provided with a spring loaded ball that engages an annular groove on the inserted pin to provide releaseable retention of the pin in the socket.

In a second embodiment, the parts of a tool are held in their storage location by solenoid actuated clamp members. The program sequencer provides a signal to the solenoid to release the parts just prior to their removal from their storage location, and provides a signal to close the members upon the tool parts just after their return to their storage location.

Thus a tool storage and selection method and apparatus is provided that has a plurality of tool storage locations which may be arranged in position and increased in number to expand tool storage capacity. The tool rest of this invention is relatively inexpensive to manufacture and maintain, and is easily adapted to hold a wide variety of tool shapes and configurations.

It is therefore an object of this invention to provide an apparatus having a tool rest that is relatively inexpensive to manufacture, can be adapted to accommodate a wide variety of tool shapes and configurations, and that has storage locations which may be arranged in position and increased in number to expand tool storage capacity.

It is an object of this invention to provide in such apparatus a tool rest that is stationary relative to the tool work station.

Another object of this invention is to provide in such apparatus automatic tool release from the tool rest of a tool that is interlocked in the tool rest just prior to tool removal from the rest, and automatic interlocked tool retention in the rest after tool return to the rest.

The above mentioned and other features and objects of this invention and the manner of attaining them will become more apparent and the invention itself will be best understood by reference to the following description of an embodiment of the invention taken in conjuction with the accompanying drawings.

BRIEF DESCRIPTION OF THE DRAWINGS

FIG. 2 is an enlarged side elevational view, partially broken away, of the jaws of the embodiment of FIG. 1, shown in a partially closed position;

FIG. 2A is an enlarged section taken at 2A—2A of FIG. 2;

FIG. 3 is a view similar to FIG. 2 wherein the jaws have moved to a closed position and have clamped upon a workpiece;

FIG. 8 is an enlarged section taken at 8—8 of FIG. 5, the tool portions shown in dashed lines in their rotated, locked position;

FIG. 9 is a partial side elevational view of the tool and tool holder of FIG. 8;

FIG. 10 is a partial view, partially in block diagram, of a second embodiment for holding the tool portions at a storage location, with the tool release position shown in dashed lines;

FIG. 11 is a top plan view of the embodiment of FIG. 10, and

DESCRIPTION OF A PREFERRED EMBODIMENT

Figure 1:
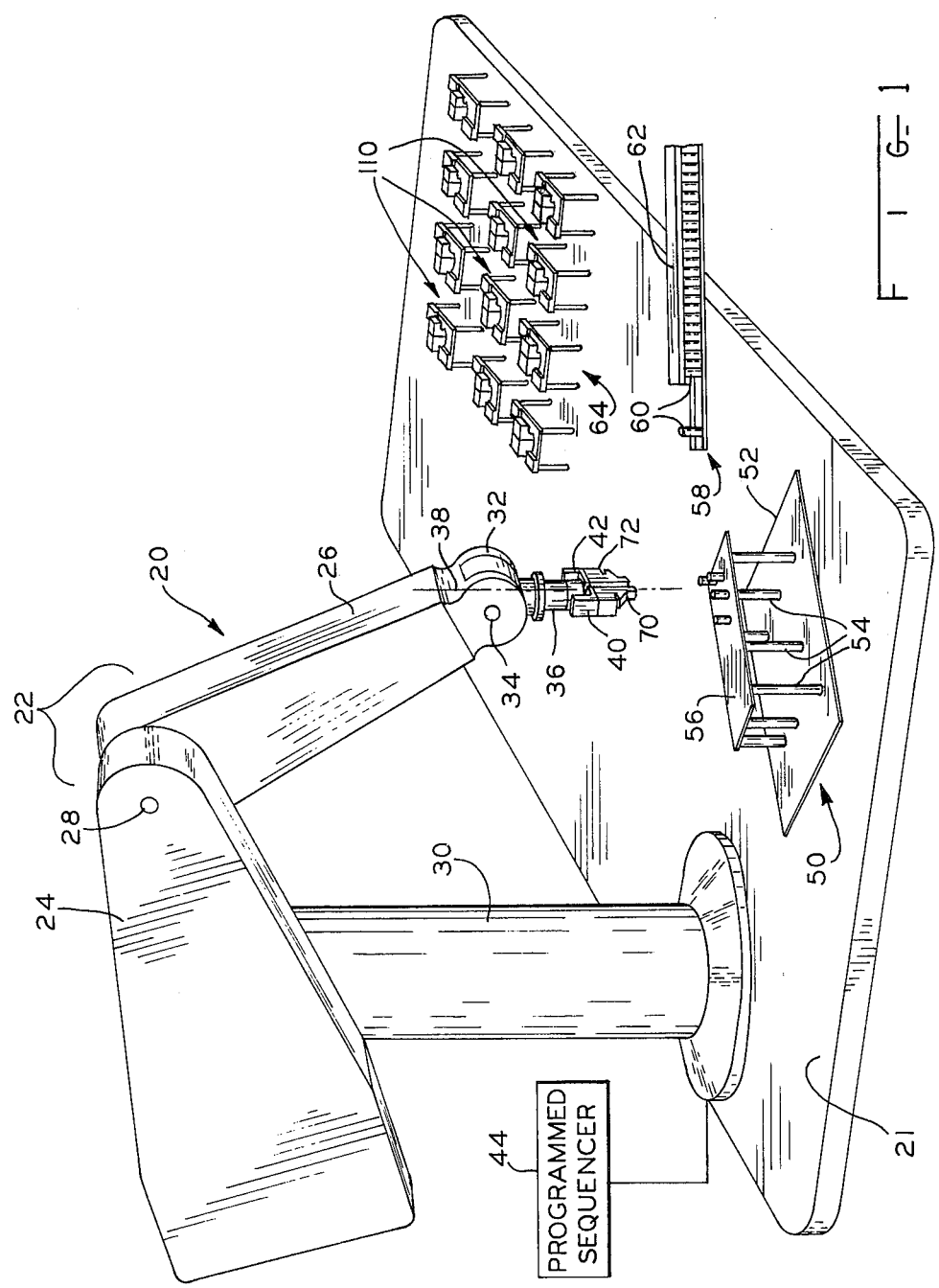
FIG. 1 is a partial view in perspective of a preferred embodiment of this invention.

Referring to FIGS. 1—7, a robotic arm machine 20, of the kind commercially available, mounted on platform 21, and having articulated arm assembly 22, with arm segments 24, 26 pivotally connected to one another at pivot 28. Assembly 22 is mounted for rotation about the axis of post 30. The distal end 32 of endmost arm segment 26 is pivotally connected to jaw mechanism 36 at pivot 34. Mechanism 36 supports for rotational movement about axis 38 a pair of jaws 40, 42. Mechanism 36 also opens and closes jaws 40, 42 in a direction transverse to axis 38. Machine 20 has mechanism to controllably move arm assembly 22 and mechanism 36 in three dimensions, and to controllably rotate jaws 40, 42 about axis 38 and to open and close jaws 40, 42 in a direction transverse to axis 38. Program sequencer 44 is provided with a program to automatically control the mechanism of machine 20 to achieve three dimensional positioning, rotation, and opening and closing of jaws 40, 42. The structure described to this point is commercially available, the PUMA ® Model Nos. 250, 500, 600, and UNIMATE ® Model No. 1000 from Unimation, Inc., Danbury, Connecticut being examples.

Referring to FIG. 1, work station 50 comprises a base 52 having a plurality of upstanding posts 54. Printed circuit board 56 is supported on the tops of posts 54, or in any other manner that provides a given board registration attachment with base 52. At workpiece supply station 58, workpieces 60 are provided in trough guide 62 from a workpiece supply, not shown, but well known to the art, which automatically advances workpieces to station 58. Each of workpieces 60 have conductive pins 61 (FIGS. 2 and 3) depending therefrom which are to be inserted in corresponding holes in board 56. The pins must be properly aligned with their respective holes prior to insertion. Numerous different types and configurations of workpieces are required to be inserted in a board 56 before the board is dip soldered or otherwise treated to electrically couple the pins in their respective holes. Each different configuration of workpiece 60 requires a correspondingly configured tool for proper gripping of the workpiece to perform the necessary work operations.

It is to be understood that there as many guides 62 supplying workpieces to station 58 as there are differently configured workpieces, only one such guide being shown for purposes of explanation simplification. For each such different workpiece 60, there is a correspondingly shaped tool assembly that is attachable to jaws 40, 42. Thus, it is necessary to store a plurality of different tools, and provide retrieval and return of the tools to the storage area during the work operation. This invention provides a system and storage apparatus and method for these purposes.

Referring to FIGS. 2 and 3, the tooling for a particular workpiece will be described. In the disclosed embodiment, the tooling comprises two portions 70, 72 each having planar mating surfaces 71, 73, respectively. Rounded surfaces 74, 76 are formed on the ends of portions 70, 72, respectively, and have a diameter D when the tools portions 70, 72 are in a closed position, FIG. 3. Portions 70, 72 are releasably attachable to jaws 40, 42 respectively. Portion 70 has vertical holes 77, 78 formed in the top surface thereof for receiving doweling pins 79, 80, respectively, which depend from jaw 40. Portion 72 has vertical holes 82, 84 formed in the top surface thereof for receiving doweling pins 86, 88, respectively, which depend from jaw 42. Holes 77, 78, 82, 84 each have spring loaded balls provided intermediately of their lengths, with the ball for hole 84 shown in FIG. 2A. Ball 90 is urged into opening 92 in the wall of hole 84 by spring 94. Set screw 96 adjusts the spring force. An annular groove 98 in pin 88 registers with ball 90 when pin 88 is fully inserted into hole 84. Thus, pin 88 is retained in hole 84 until a predetermined removal force corresponding to adjustment of set screw 96 is exerted, causing ball 90 to ride out of groove 98 against the force of spring 94.

A transverse doweling pin 100, FIGS. 2 and 3, extends from jaw 42 and registers with and is frictionally and slidably received by transverse hole 102 formed in jaw 40, when jaws 40, 42 are closed together.

Jaws 40, 42 are rotatable about axis 38 and movable transversely to axis 38 for opening and closing by mechanism in machine 20. In FIG. 2, jaws 40, 42 and their respective tool portions 70, 72 are shown in an open position prior to their gripping of workpiece 60, and in FIG. 3 are shown closed upon a workpiece 60 for transporting of the workpiece. Tool portions 70, 72 have depending sections 104, 106, respectively, which have inside surface configurations conforming to a particular workpiece outside surface configuration in order to firmly grip the workpiece.

Tool station 64 comprises a plurality of storage locations, each of which has a tool holder 110, which holders are shown in FIG. 1 separate from one another and arranged in a matrix or grid pattern, but may be positioned in banks, tiers, or other arrangements that are within the reach of arm assembly 22, to increase tool storage capacity. By making tool holders 110, in whatever arrangement, stationary relative the work station 50, many different tool arrangements are possible to suit a particular work operation.

Insertion and retention of tool portions 70, 72 in a holder 110 will now be described referring to FIGS. 4-9. In each storage holder 110, a square plate 112 has a generally circular opening 114 having a large diameter which is the vertical dimension of opening 114 as shown in FIG. 8, with two diametrically opposed inwardly projecting lips 116, 118 which have inner radii from axis 38, which is perpendicular to plate 112, forming a diametral distance between the lips, or small diameter of opening 114, to retain tool portions 70, 72, in holder 110, as will become apparent. Plate 112 is supported by four corner posts 120, 122, 124, 126. Diagonally opposed stop blocks 128, 130 are formed on the upper surface of plate 112, block 128 having stop edges 131, 132 and block 130 having stop edges 133, 134. Detents 136, 138 are formed in the lower surface of plate 112 adjacent the edges of lips 116, 118 respectively, to receive spring loaded balls 140, 142, FIG. 2, respectively. Balls 140, 142 are set in tool portions 70, 72, respectively, in a similar manner to that for balls 90, and protrude from the lower surfaces of slots 144, 146, respectively. Springs 148, 150 act against balls 140, 142, respectively, and spring force adjusting set screws 152, 154 are threadedly engaged in corresponding tapped holes in portions 70, 72, respectively.

When tool portions 70, 72 are closed on a workpiece 60, FIG. 3, the distance D between surfaces 74, 76 is slightly less than the large diameter of opening 114. The distance d between the inner sides 145, 147 of slots 144, 146, respectively, is slightly less than the diametral distance between the opposing edges of lips 116, 118, or the small diameter of opening 114. The distance between the vertical surfaces 141, 143 of portions 70, 72, respectively, is larger than the large diameter of opening 114 to provide a positive stop of downward tool movement into holder 110. The foregoing distances are measured when the tool portions are in the closed position of FIG. 3.

The insertion of tool portions 70, 72, into a tool holder 110 will now be described with reference to FIGS. 4-7. Portions 70, 72 are moved to a closed position by jaws 40, 42 and are rotated until surfaces 74, 76 are in vertical alignment with the large diameter of opening 114, FIG. 4. Tool portions 70, 72 are lowered into opening 114, FIG. 5, and rotated counterclockwise 90° until they engage stop edges 132, 134, respectively, FIG. 6, also shown in positions 70a, 72a, FIG. 8. Slots 144, 146 are thus slidingly rotated into registry with lips 116, 118 respectively, to prevent vertical removal of portions 70, 72 from holder 110. Balls 140, 142 roll into detents 136, 138 respectively, in the fully rotated position. Jaws 40, 42 are then lifted from tool portions 70, 72, FIG. 7, and proceed to another holder 110 to engage a different tool for the next work operation.

Figure 4:
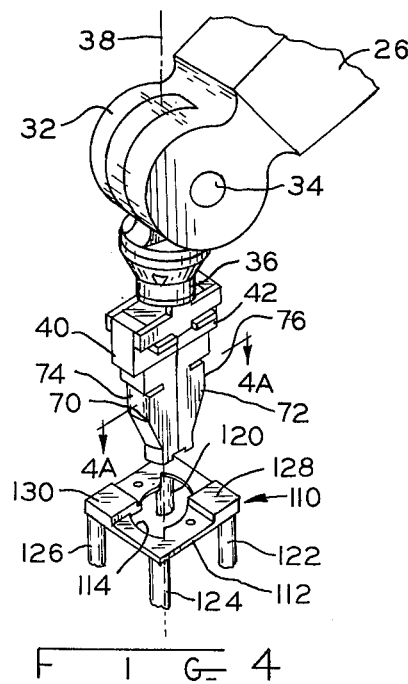
FIG. 4 is a partial perspective view of the jaws having tool portions mounted therein descending upon a tool holder at a storage location.
Figure 5:
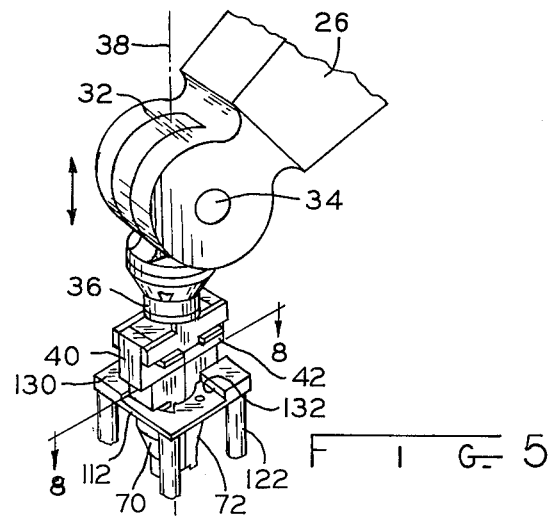
FIG. 5 is a view similar to the view in FIG. 4 with the tool portions lowered into the opening of a tool holder.
Figure 6:
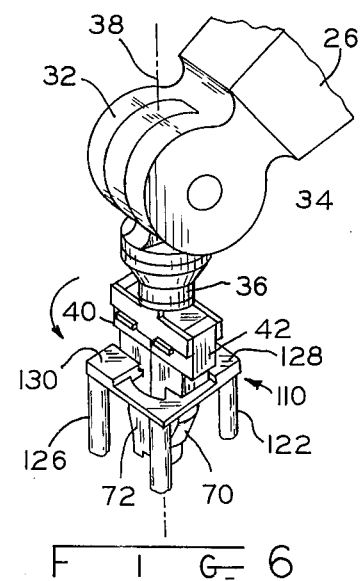
FIG. 6 is a view similiar to FIG. 5 with the jaws and tool portions rotated 90° to a tool lock position.
Figure 7:
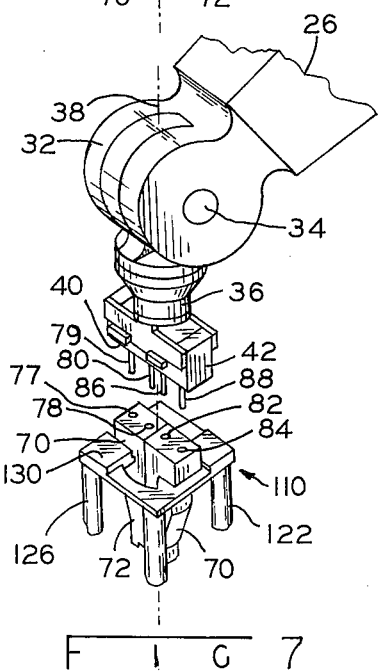
FIG. 7 is a view similiar to FIG. 6 with the jaws having pulled free from the tool portions retained in a tool holder.
Figure 4A:
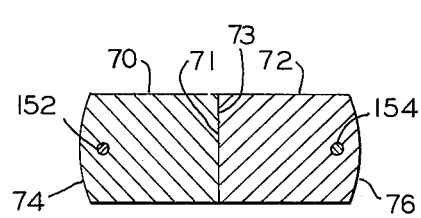
FIG. 4A is a section taken at 4A—4A of FIG. 4.

In obtaining another tool, the above procedure is reversed, starting with the position in FIG. 7 and working back to the position of FIG. 4. Thus, jaws 40, 42 move downwardly towards tools 70, 72 with pins 79, 80, 86, 88 entering holes 77, 78, 82, 84 respectively, until balls 90 roll into grooves 84 of their respective pins. The tool portions are then turned clockwise 90° about axis 38 until the tool portion sides engage stop edges 131, 133 respectively, FIGS. 5 and 8, at which time lips 116, 118 are clear of slots 144, 146, respectively, and tool portions 70, 72 may be lifted from holder 110 and carried to supply station 58 to pick up a workpiece 60, and then carried to work station 50 to insert workpiece 60 in a printed circuit board 56.

An alternate embodiment for retention of tool portions 70, 72 in holder 110 is shown in FIGS. 10 and 11. Solenoid 160, having armature 162, is coupled to sequencer 44 and is actuated by electrical signals generated by the program in sequencer 44. Cross bar 164 is fixed to the distal upper end of armature 162 and carries pivots 166, 168 to which are pivotally connected first ends of links 170, 172 respectively. The opposite ends of links 170, 172 are pivotally connected to clamping members 178, 180 respectively, which are slidably mounted for horizontal reciprocal motion. Member 178 is mounted between spaced parallel channeled tracks 174, and member 180 is mounted between channeled tracks 176. Concave surfaces 182, 184 are formed on the facing ends of members 178, 180 respectively, and are configured to the surfaces 74, 76 respectively. When armature 162 is in its lowermost position, solid lines FIG. 10, members 178, 180 are in their innermost positions so that surfaces 182, 184 are clamped tightly against surfaces 74, 76 respectively, inhibiting movement of portions 70, 72. When armature 162 is in its raised position, shown in dashed lines in FIG. 10, members 178, 180 are in their outermost positions 178a, 180a and surfaces 182, 184 are disengaged from surfaces 74, 76, releasing portions 70, 72 for removal from holder 110. Members 178, 180 do not separate a distance greater than the distance between surfaces 141, 143 so that the upper surfaces of members 178, 180 engage the upper surfaces of slots 144, 146 respectively to provide vertical support and positioning of portions 70, 72 when they are lowered into holder 110.

Figure 12:
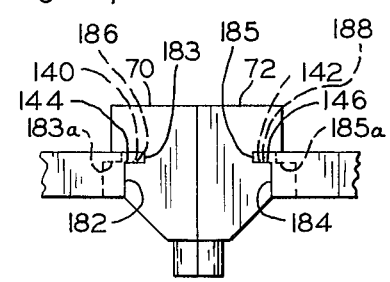
FIG. 12 is a partial view of a modification of the second embodiment shown in FIG. 10.

Referring to FIG. 12, a modification of the embodiment of FIG. 10 is shown having inwardly extending lips 183, 185 formed at the upper portions of surfaces 182, 184 respectively. Lips 183, 185 slidingly enter slots 144, 146 respectively when members 178, 180 are in their innermost positions. Dimple-like indentations 186, 188 are formed on the lower surfaces of lips 183, 185 respectively and register with balls 140, 142 when members 178, 180 are in their innermost positions, to positively hold portions 70, 72 against any movement relative to holder 110. When members 178, 180 are moved apart by solenoid 160 to their outermost positions, lips 183, 185 are moved apart, with balls 140, 142 rolling out of indentations 186, 188 respectively, to the dashed line positions 183a, 185a, FIG. 12, sliding out of slots 144, 146 respectively, thus permitting removal of portions 70, 72 from holder 110. As in the embodiment of FIG. 10, members 178, 180 do not separate a distance greater than the distance between the lips in positions 183a, 185a, thus providing vertical positioning and support of portions 70, 72.

Positive positioning of portions 70, 72 in holder 110 can also be obtained by forming an inwardly directed pin on each of members 178, 180, the pins engaging corresponding sockets in portions 70, 72, when members 178, 180 are in their innermost positions.

Sequencer 44 sequences the movements of arm assembly 22 and solenoid 160 to move armature 162 downwardly when tool portions 70, 72 have been returned to holder 110, and to move armature 162 upwardly when portions 70, 72 are to be lifted from holder 110 and are to be carried by arm assembly 22 to supply station 58, and then work station 50.

While there have been described above the principles of this invention in connection with specific apparatus, it is to be understood that such apparatus is only by way of example and not as a limitation to the scope of the invention, which is defined in the following claims.

What is claimed is:

1. Apparatus for storing and holding tools comprising:
    a work station;
    a tool rest having a plurality of tool storage locations; said tool rest being stationary relative to the work station;
    first means for transporting individual tools between a storage location in said tool rest and the work station;
    said first means comprising second means for releasably attaching individual tools;
    third means associated with said tool rest for releasably holding individual tools in said tool rest; said third means being operable in conjunction with said second means to release a tool from said tool rest prior to tool transport by said first means to the work station and for receiving and holding a tool in said tool rest after return by said first means to said tool rest;
    said first means comprises an articulated arm having a plurality of connected arm segments;
    said second means comprising a pair of jaws operably movable relative one another between open and closed positions, said jaws being supported at the distal end of a last arm segment;

said first means providing three dimensional movement of said arm to move said jaws between said tool rest and the work station and for opening and closing said jaws about a tool;

each tool has a pair of separable portions and each of said jaws has means for releasably attaching a separate tool portion whereby a jaw is releasably attachable to a tool portion prior to tool removal from said tool rest and detachable from the tool portion after return to the tool rest, so that the tool portions may be stored at a storage location when not in use and may be removed from the storage location, with a tool portion attached to each jaw, for three dimensional movement and for relative opening and closing between the tool portions.

2. The apparatus of claim 1 including a tool holder at each of said storage locations, said tool holder comprising a plate, an opening in said plate, said opening having an axis substantially perpendicular to said plate;

said first means comprising means for rotating said second means from a first rotative position to a second rotative position about said axis;

said third means for holding and retaining an individual tool at its respective tool holder when said second means is in said first rotative position about said axis, and for releasing the tool when said second means is in a second rotative position about said axis.

3. The apparatus of claim 2 wherein said plate has a substantially transverse first lip projecting inwardly from the opening circumference towards the opening axis; whereby said lip is slidable into a corresponding slot in the tool when said second means is in said first rotative position to retain the tool in said tool rest, and said lip is slidable out of the tool slot when said second means is in said second rotative position, to release the tool from said tool rest.

4. The apparatus of claim 3 wherein said plate includes a second lip diametrically opposed to said first lip and projecting inwardly from the opening circumference; whereby said second lip is slidable into a corresponding second slot in the tool when said second means is in said first rotative position.

5. The apparatus of claim 3 including a tool having a tool body; a slot being formed in said tool body for slidably receiving said lip; a spring loaded ball being mounted in said tool body, said ball extending into said slot; a ball detent being formed in a surface of said lip and registrable with said ball, whereby said detent receives said spring loaded ball when said second means is in said first rotative position.

6. The apparatus of claim 1 including a tool; said tool comprising a pair of separable tool portions; said portions having facing sides;

a pin projecting from one of said sides and a pin hole being formed in the other of said sides; said hole being registrable with said pin for receiving said pin in a friction fit when said portion sides are urged together.

7. The apparatus of claim 1 wherein said third means comprises a pair of opposed clamping members;

clamping member actuating means for automatically actuating said opposed clamping members to move towards one another to clamp a tool at its respective storage location after tool return by said first means from the work station, to provide tool retention in the tool rest during tool storage;

said clamping member actuating means for separating said clamping members to release the tool prior to tool transport by said first means to the work station.

8. The apparatus of claim 7 wherein said clamping members actuating means comprises a solenoid;

a link pivotally connected to each of said clamping members and pivotally connected to said solenoid, whereby actuation of said solenoid will move said clamping members through said links toward and away from each other.

9. The apparatus of claim 7 or 8 including a lip projecting from each of said clamping members, said lips extending towards one another and each lip movable into a corresponding groove in an individual tool member during clamping and removable from the groove during unclamping.

10. Apparatus for use with a tool transporting member for transporting a tool having separable portions comprising:

a pair of jaws adapted for connection to and movable by the transporting member;

means for moving said jaws relative one another between open and closed positions;

first means on each of said jaws for releasably attaching a separate tool portion;

a tool rest having at least one tool storage location;

second means at each said storage location for releasably holding the separable tool portions and operable in conjunction with said first means for attaching a jaw to a tool portion prior to the tool portion being released by said second means and detaching a jaw from a tool portion after the tool portion is held by said second means.

11. The apparatus of claim 10 including a tool holder at each of said storage locations, said tool holder comprising a plate, an opening in said plate, said opening having an axis substantially perpendicular to said plate;

third means for rotating said first means from a first rotative position to a second rotative position about said axis;

said second means for holding and retaining an individual tool at its respective tool holder when said first means is in said first rotative position about said axis and for releasing the tool when said first means is in a second rotative position about said axis.

12. The apparatus of claim 11 wherein said plate has a substantially transverse first lip projecting inwardly from the opening circumference towards the opening axis; whereby said lip is slidable into a corresponding slot in the tool when said first means is in said first rotative position to retain the tool in said tool rest, and said lip is slidable out of the tool slot when said first means is in said second rotative position, to release the tool from said tool test.

13. The apparatus of claim 12 wherein said plate includes a second lip diametrically opposed to said first lip and projecting inwardly from the opening circumference; whereby said second lip is slidable into a corresponding second slot in the tool when said first means is in said first rotative position.

14. The apparatus of claim 12 including a tool having a tool body; a slot being formed in said tool body for slidably receiving said lip; a spring loaded ball being mounted in said tool body, said ball extending into said slot; a ball detent being formed in a surface of said lip and registrable with said ball, whereby said detent receives said spring loaded ball when said first means is in said first rotative position.

15. The apparatus of claim 10 wherein said second means is for releasably clamping and interlocking individual tools in said tool rest at respective tool storage locations; said second means for releasing a clamped and interlocked tool from said tool rest after attachment by said first means to the tool portions and for receiving and releasably clamping and interlocking a tool in said tool rest prior to release of the tool portions by said first means whereby the tool is precisely positioned in its respective tool storage location;

said second means comprising a pair of opposed clamping members;

clamping member actuating means for automatically actuating said opposed clamping members to move towards one another to clamp a tool at its respective storage location to provide tool retention in the tool rest during tool storage;

said clamping member actuating means for separating said clamping members to release the tool prior to tool removal from its respective storage location.

16. The apparatus of claim 15 wherein said clamping member actuating means comprises a solenoid;

a link pivotally connected to each of said clamping members and pivotally connected to said solenoid, whereby actuation of said solenoid will move said clamping members through said links toward and away from each other.

17. The apparatus of claim 15 or 16 including a lip projecting from each of said clamping members, said lips extending towards one another and each lip adapted to move into a corresponding groove in an individual tool portion during clamping and removable from the groove during unclamping.

* * * * *